(12) United States Patent
Shirakura et al.

(10) Patent No.: US 6,262,819 B1
(45) Date of Patent: Jul. 17, 2001

(54) HOLOGRAM IMAGE RECORDING APPARATUS AND METHOD

(75) Inventors: Akira Shirakura, Tokyo; Hirotsugu Suzuki, Chiba, both of (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/342,996

(22) Filed: Jun. 29, 1999

(30) Foreign Application Priority Data

Jun. 30, 1998 (JP) .................................................. 10-185253

(51) Int. Cl.[7] ...................................................... G03H 1/04
(52) U.S. Cl. ................................... 359/35; 359/1; 359/23
(58) Field of Search ..................... 359/1, 23, 35

(56) References Cited

U.S. PATENT DOCUMENTS

| | | | |
|---|---|---|---|
| 4,163,290 | * | 7/1979 | Sutherlin et al. ......................... 359/2 |
| 4,411,489 | * | 10/1983 | McGraw ................................. 359/23 |
| 4,547,141 | * | 10/1985 | Ruschmann ............................... 359/3 |
| 4,783,133 | * | 11/1988 | Chen ..................................... 359/23 |
| 5,949,559 | * | 9/1999 | Kihara et al. ........................... 359/23 |

OTHER PUBLICATIONS

C.J. Bartleson and C.P. Bray, "On the Preferred Reproduction of Flesh, Blue–Sky, and Green–Grass Colors", Research Laboratories, Eastman Kodak Comapny, Rochester, NY., Photographic Science and Engineering, vol. 6, No. 1, Jan.–Feb. 1962, pp. 19–25.

Nobuhiro Kihara, Akira Shirakura and Shigeyuki Baba, "One–Step Edge–Lit Transmission Holographic Stereogram Printer", Reprinted from Practical Holography XIII, SPIE—The International Society for Optical Engineering, Research Center, Sony Corporation, Tokyo, Japn, vol. 3637, Jan. 25, 1999, San Jose, California, pp. 2–11.

Akira Shirkura, Nobuhiro Kihara and Shigeyuki Baba, "Instant Holographic Portrait Printing System", Reprinted from Practical Holography XII, SPIE—The International Society for Optical Engineering, Research Center, Sony Corporation, Tokyo, Japan, vol. 3293, Jan. 26, 1998, San Jose, California, pp. 248–255.

Michael A. Klug, Michael W. Halle, Mark Lucente and Wendy J. Plesniak, "A Compact Prototype One–Step Ultragram Printer", MIT Media Laboratory, Cambridge, MA., pp. 1–10, Feb., 1993.

Gary Dispoto, Larry Mather and John Meyer, "Designer's Guide to Raster Image Printer Algorithms", First Edition, Dec. 9, 1986, pp. ii–iii, 1–31.

* cited by examiner

*Primary Examiner*—Darren Schuberg
(74) *Attorney, Agent, or Firm*—Frommer Lawrence & Haug, LLP.; William S. Frommer; Dennis M. Smid

(57) ABSTRACT

A hologram-image recording method and apparatus are provided which prevents or attenuates vibrations so as to produce a bright holographic stereogram having high diffraction efficiency. Such apparatus may includes an exposing recording portion for sequentially exposing and recording interference fringes generated by an object laser beam modulated in accordance with each element image of parallax images and a reference laser beam having coherency with the object laser beam on a recording medium as an elemental hologram, wherein the object laser beam is incident on a surface of the recording medium and the reference laser beam is incident on one of said surface and an opposite surface of the recording medium. The apparatus may further include a moving device for moving the recording medium in a predetermined direction and a braking device for applying a load to the recording medium which resists the movement thereof.

22 Claims, 10 Drawing Sheets

PLAN VIEW SHOWING
RECORDING-MEDIUM FEEDING MECHANISM

SCHEMATIC VIEW SHOWING OPTICAL SYSTEM OF HOLOGRAPHIC-STEREOGRAM PRODUCING APPARATUS

PLAN VIEW SHOWING
RECORDING-MEDIUM MOVING SYSTEM

PLAN VIEW SHOWING
RECORDING-MEDIUM FEEDING MECHANISM

PLAN VIEW SHOWING RECORDING-MEDIUM MOVING SYSTEM

PLAN VIEW SHOWING
RECORDING-MEDIUM MOVING SYSTEM

FRONT VIEW SHOWING
RECORDING-MEDIUM FEEDING MECHANISM

PLAN VIEW SHOWING
RECORDING-MEDIUM MOVING MECHANISM

GRAPH SHOWING CHANGE IN MOVEMENT
SPEED OF RECORDING MEDIUM AS TIME ELAPSES

CROSS SECTIONAL VIEW OF A PORTION
OF HOLOGRAM RECORDING MEDIUM

DIAGRAM SHOWING SENSITIZING PROCESS
OF PHOTOPOLYMERIZING PHOTOPOLYMER

SCHEMATIC VIEW SHOWING OPTICAL SYSTEM OF CONVENTIONAL HOLOGRAPHIC-STEREOGRAM PRODUCING APPARATUS

HOLOGRAM IMAGE RECORDING APPARATUS AND METHOD

BACKGROUND OF THE INVENTION

The present invention relates to a hologram-image recording apparatus and method for producing holographic stereogram which is capable of producing a three-dimensional rendition of either a photograph or an image produced by a computer.

A holographic stereogram is produced by imaging two pictures of a single object obtained by sequentially photographing the object from different observing points. These two pictures are sequentially exposed and recorded on one hologram recording medium as a collection of oblong or dot shaped elements. A user can identify a two-dimensional image, including an aggregate of image information of a portion of the hologram, when the user looks at the holographic stereogram through one eye from a certain position. When the user looks at the holographic stereogram from another position, the user can see a two-dimensional image, including an aggregate of image information of another portion of the hologram. Therefore, when the user looks at the holographic stereogram with both eyes, the parallax between the two eyes causes the recorded hologram to be observed as a three-dimensional image.

Such a holographic stereogram can be produced by a holographic stereogram producing apparatus 100 shown in FIG. 12 (A). Holographic stereogram producing apparatus 100 includes a laser-beam source 101 for emitting a single wavelength laser beam L10 exhibiting excellent coherency, and a partial reflecting mirror 102 for splitting laser beam L10 into an object laser beam L11 and a reference laser beam L12. Optical elements 103 to 107 comprise an optical system for acting upon object laser beam L11, and a transmissive LCD display unit 108 is also provided for further acting upon object laser beam L11. Optical elements 109 to 111 comprise an optical system for acting upon reference laser beam L12. Finally, an electromotive stage 113 is provided for holding a hologram recording medium 112 upon which object laser beam L11 and reference laser beam L12 converge, and for moving hologram recording medium 112 as required.

The optical system for acting upon object laser beam L11 includes the following optical elements sequentially disposed along the optical axis of the path of object laser beam L11. A total reflection mirror 103 is first provided for changing the direction of beam L11. Beam L11 then passes through a first cylindrical lens 104 that diffuses beam L11 in a one dimensional direction. A collimator lens 105 receives beam L11 and forms beam L11 into a plurality of parallel laser beams. A projecting lens 106 and a second cylindrical lens 107 are also provided for guiding beam L11 to hologram recording medium 112. Display unit 108 is disposed along the light path of beam L11, and comprises a transmission type liquid crystal panel disposed between the collimator lens 105 and the projecting lens 106. Image data output from an image processing portion (not shown) is displayed on the display unit 108.

The optical system for acting upon reference laser beam L12 includes the following optical elements sequentially disposed along the optical axis of the path of reference laser beam L12. A cylindrical lens 109 is first provided for diffusing beam L12 in a one dimensional direction. Beam L12 then passes to a collimator lens 110 that forms diffused beam L12 into a plurality of parallel laser beams. A total reflection mirror 111 for changing the transmission direction of reference laser beam L12 to arrive at hologram recording medium 112 is also provided.

Hologram recording medium 112 comprises, for example, a photosensitive film. As shown in FIG. 12 (B) as well as FIG. 12(A), medium 112 is held by an electromotive stage 113. When electromotive stage 113 is moved, medium 112 is intermittently moved as desired in a direction indicated by an arrow b.

During operation, laser beam L10 is emitted from laser-beam source 101 and is incident on half mirror 102, as shown in FIG. 12(A). Half mirror 102 splits laser beam L10 into object laser beam L11 and reference laser beam L12. Object laser beam L11 is incident on display unit 108 through first cylindrical lens 104 and collimator lens 105. When object laser beam L11 passes through display unit 108, object laser beam L11 is image-modulated in accordance with to an image displayed on display unit 108. Modulated object laser beam L11 is incident on recording medium 112 after passing through projecting lens 106 and second cylindrical lens 107. Reference laser beam L12 is incident on recording medium 112 through the optical system composed of cylindrical lens 109, collimator lens 110 and total reflection mirror 111. Interference fringes generated between the reference beam and the modulated object beam are sequentially recorded in the form of oblong or dot shapes on recording medium 112. These recorded interference fringes form the hologram.

Vibrations exerted on the hologram recording medium 112 disposed in the exposing and recording portion P100 when each hologram is exposed and recorded may have an adverse influence on the produced holographic stereogram. That is, the holographic stereogram producing apparatus 100 may encounter this problem when small vibrations on the order of the wavelength of the laser beam L10 are exerted on the recording medium 112. As a result of such problem, the state of interference fringes which are sequentially exposed and recorded on the recording medium 112 may become instable and a portion of the hologram which are exposed and recorded may encounter a phenomenon wherein the diffraction efficiency and brightness deteriorate. If greater vibrations are exerted on the holographic stereogram producing apparatus 100, the exposing and recording of the hologram on the recording medium 112 may not be able to be performed.

When a portion of the hologram have been exposed and recorded on the recording medium 112 wherein the diffraction efficiency is unsatisfactorily low due to the influence of vibrations or the like, such portion of the hologram may be in a dark state upon performing a reproducing operation. Accordingly, in such situation, uniformity of the images deteriorates.

As a result, the holographic stereogram producing apparatus 100 is generally provided with a vibration isolator for isolating external vibrations and quickly attenuating exerted vibrations so as to enable an element hologram to be stably exposed and recorded on the recording medium 112. The vibration isolator may include an air damper or springs appropriately disposed between a substrate on which the laser-beam source 101 and the optical elements of the optical system have been mounted and the case of the apparatus. Such vibration isolator may effectively prevent external vibrations.

Additionally, the holographic stereogram producing apparatus 100 should prevent vibrations of the recording medium 112 which may be exerted by a guide means and a moving means for holding and moving the recording medium 112.

The guide means and the moving means should secure the recording medium 112 so as to prevent small vibrations which may correspond to the wavelength of the laser beam L10 during exposing and recording of the hologram on the recording medium 112 which is performed in the exposing and recording portion P100. When the exposing and recording of the hologram on the recording medium 112 has been completed, the guide means and the moving means may quickly move the recording medium 112. When the recording medium 112 which has been moved for a predetermined distance is stopped, vibrations may be created which should be quickly damped or attenuated.

However, in the holographic stereogram producing apparatus 100, it may take approximately two seconds for vibrations created due to the movement and stopping of the recording medium 112 to be attenuated after the recording medium 112 has been stopped. Therefore, the holographic stereogram producing apparatus 100 may need a relatively long time period to dampen the vibrations of the recording medium 112 whenever the electromotive stage 113 is used to expose and record a hologram. As a result, a relatively large amount of time may be needed to produce one holographic stereogram.

Therefore, the holographic stereogram producing apparatus may be provided with a moving mechanism incorporating a guide and a moving apparatus in place of the foregoing electromotive stage 113 for preventing vibrations of the hologram recording medium 112. The recording medium 112 is disposed on two parallel rollers each having a predetermined tension imparted thereon by a torsion coil spring or the like. The object laser beam L11 and the reference laser beam L12 are incident on the recording medium 112 while an optical element is being pressed against the recording medium 112. Only ¼ of the time or less may be required for damping vibrations created by the movement of the recording medium 112. However, such a guide and a moving apparatus require complicated structures.

The holographic stereogram producing apparatus 100 may incorporate another moving mechanism which does not employ a torsion coil spring. In this case, a motor constantly inversely rotates a slip member. The force of these rotations are transmitted to one of the parallel rollers so as to generate a predetermined torque. However, such motor may be rotated during an exposing and recording operation, whereupon internal vibrations may be created. Thus, the hologram being exposed and recorded may become instable. As a result, the quality of the produced holographic stereogram deteriorates.

OBJECTS AND SUMMARY OF THE INVENTION

An object of the present invention is to provide a hologram-image recording apparatus and method which are capable of solving the above-mentioned problems.

Another object of the present invention is to provide a hologram-image recording apparatus and method as aforesaid which minimizes or prevents vibrations created in the hologram recording medium so as to produce an accurate holographic stereogram.

In accordance with an aspect of the present invention, a hologram-image recording apparatus is provided which comprises an exposing recording portion for sequentially exposing and recording interference fringes generated by an object laser beam modulated in accordance with each element image of parallax images and a reference laser beam having coherency with the object laser beam on a recording medium as an elemental hologram, wherein the object laser beam is incident on a surface of the recording medium and the reference laser beam is incident on one of said surface and an opposite surface of the recording medium, a moving device for moving the recording medium in a predetermined direction, and a braking device for applying a load to the recording medium which resists the movement thereof. A corresponding method is also provided.

The present hologram-image recording apparatus may incorporate a braking device which quickly attenuates or stops vibrations of the moving recording medium. As a result, an element image can be stably maintained during an exposing and recording operation. Thus, the present hologram-image recording apparatus stably exposes and records interference fringes generated by an object laser beam and a reference laser beam such that an accurate element hologram may be exposed and recorded, whereupon a bright and stable holographic stereogram having excellent diffraction efficiency may be produced.

Other objects, features and advantages of the present invention will become apparent from the following detailed description of the illustrated embodiments when read in conjunction with the accompanying drawings in which corresponding components are identified by the same reference numerals.

BRIEF DESCRIPTION OF THE DRAWINGS

FIGS. 11(A)–11(C) diagrams of a sensitizing process of the hologram recording medium, in which FIG. 11(A) illustrates an initial state, FIG. 11(B) illustrates an exposed state, and FIG. 11(C) illustrates a fixed state.

DETAILED DESCRIPTION OF THE PREFERRED EMBODIMENTS

Embodiments of the present invention will now be described with reference to the drawings.

Figure 1:
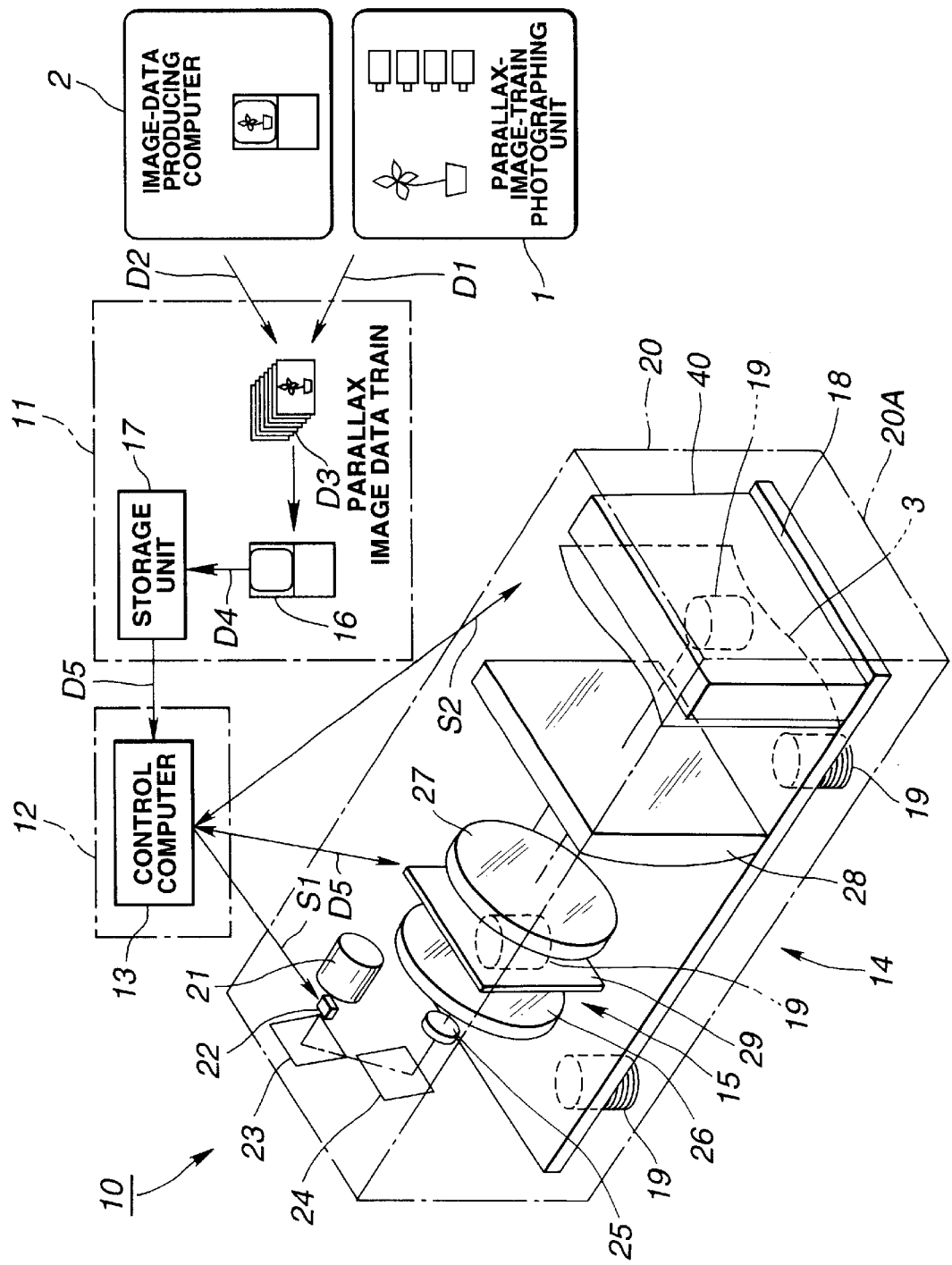
FIG. 1 schematically illustrates the overall structure of a holographic-stereogram producing apparatus in accordance with an embodiment of the present invention.
Figures 2A, 2B:
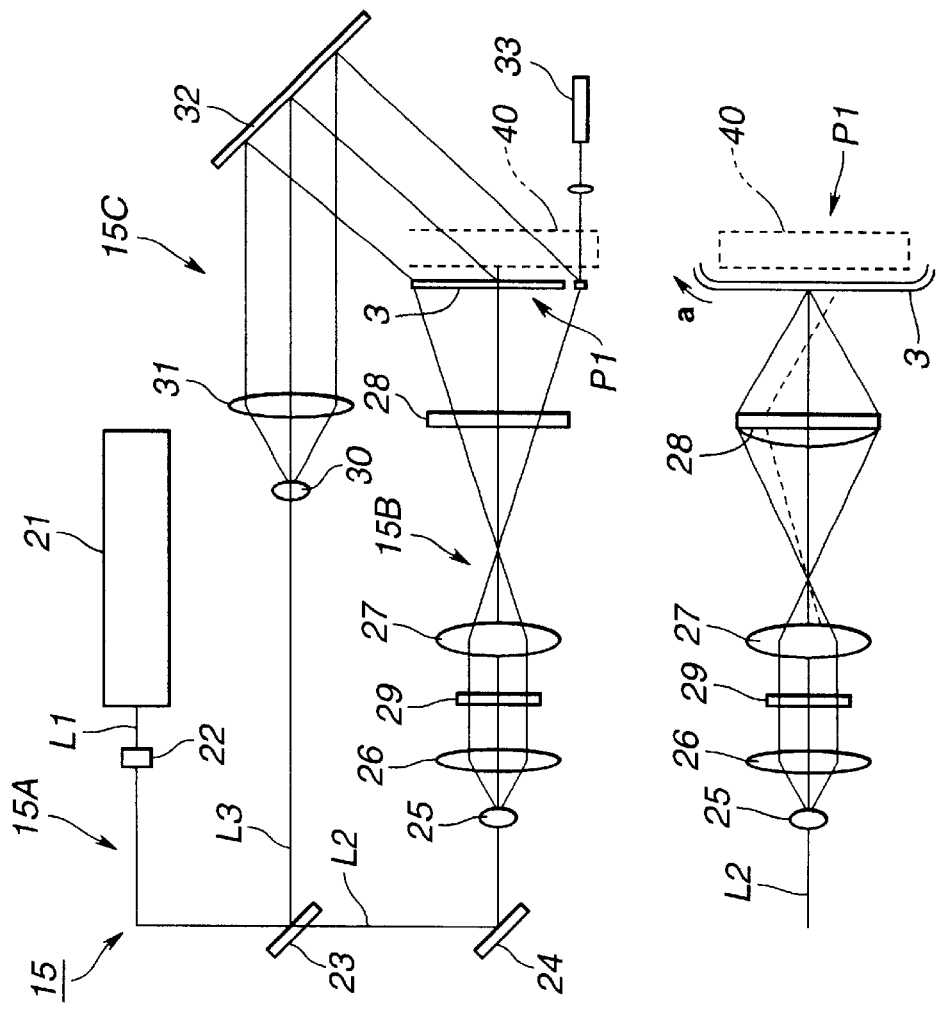
FIGS. 2(A) and 2(B) schematically illustrate an optical system of the holographic-stereogram producing apparatus of FIG. 1.
Figure 3:
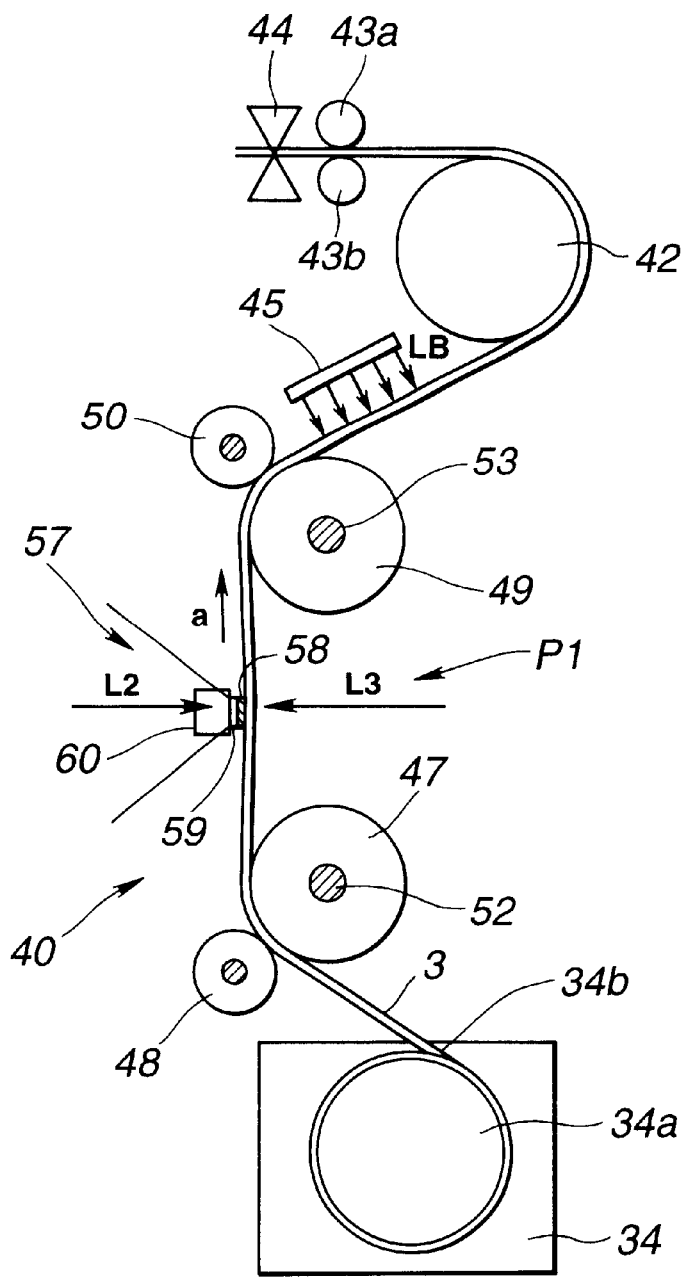
FIG. 3 is a plan view of a recording-medium moving system provided for the holographic-stereogram producing apparatus of FIG. 1, in which a light-guiding block member is provided for an object laser beam portion and a holding mechanism is pressed against a hologram recording medium from the object laser beam portion.

A holographic-stereogram producing apparatus 10 shown in FIG. 1 may include an exposing and recording portion P1 (FIGS. 2A and 2B). An object laser beam L2 and a reference laser beam L3 based on a plurality of oblong hologram elements are projected incident on a recording medium positioned in this area P1. Interference fringes produced between the object laser beam L2 and the reference laser beam L3 are exposed and recorded on a hologram recording medium 3 so as to produce a holographic stereogram. The hologram recording medium 3 may be a photosensitive film which is loaded into a film cartridge 34 (FIG. 3). The hologram recording medium 3 may be intermittently moved by a recording-medium feeding mechanism 40.

The hologram recording medium 3 for use in the holographic-stereogram producing apparatus 10 may be a so-called film coating type recording medium having a tape-shape film base 4 on which a photopolymer layer 5 composed of photopolymerization-type photopolymers is formed and a cover sheet layer 6 applied to the photopolymer layer 5.

Figure 11A:
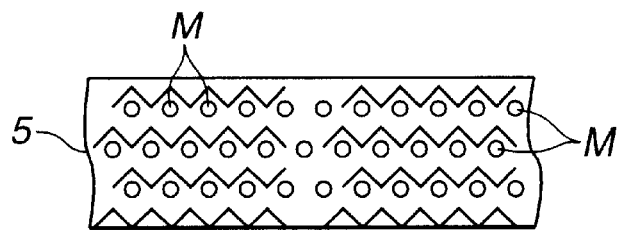
Figure 11B:
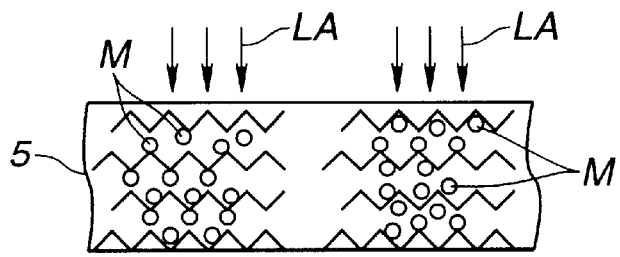
Figure 11C:
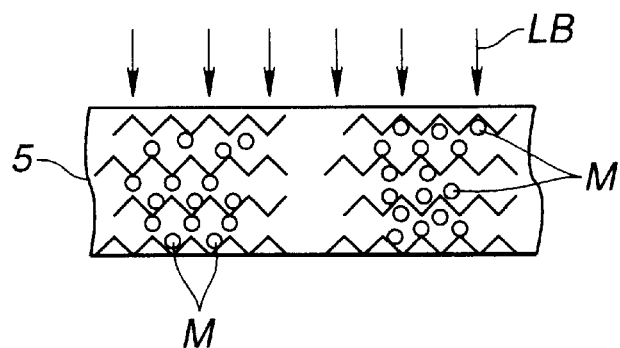
Figures 12A, 12B:
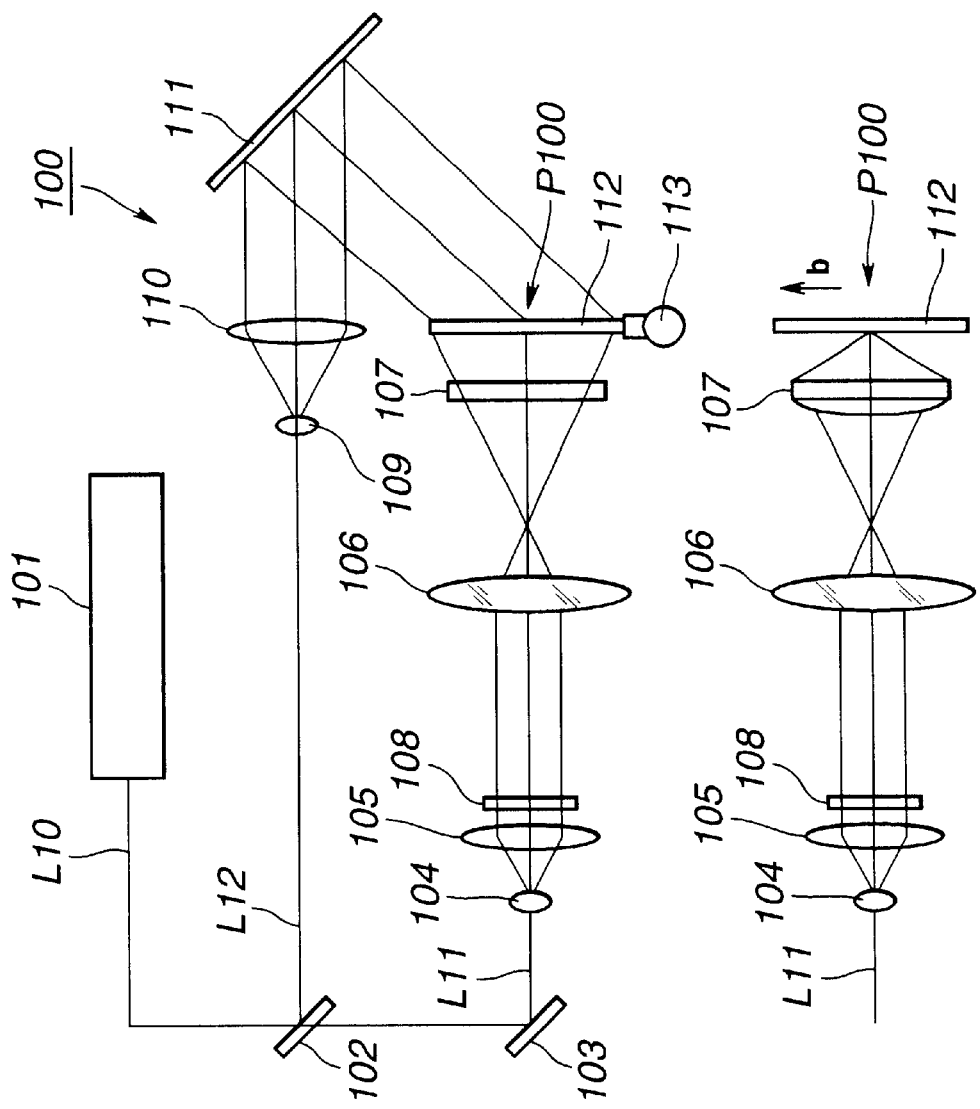
FIGS. 12(A) and 12(B) are diagrams of an optical system of a holographic-stereogram producing apparatus.

With reference to FIGS. 11(A)–11(C), the principle of exposing and recording element hologram items or holograms on the hologram recording medium 3 will now be described. In the hologram recording medium 3, photopolymerization-type photopolymers of the photopolymer layer 5 may have an initial state wherein monomers M are dispersed in matrix polymers, as shown in FIG. 11(A). When the photopolymerization-type photopolymers are irradiated with a laser beam LA having a predetermined power, such as between 10 mJ/cm$^2$ to 400 mJ/cm$^2$, monomers M uniformly dispersed in the matrix polymers in the exposed portion may be polymerized into polymers, as shown in FIG. 11(B). As the polymerization of the photopolymerization-type photopolymers proceeds, modulation of the refractive index occurs between the exposed portions and the non-exposed portions due to nonuniformity of the concentration of monomers M caused by movement of monomers M. Then, as shown in FIG. 11(C), the surface of the photopolymerization-type photopolymers may be irradiated with a laser beam or ultraviolet rays or visible light LB having a predetermined power, such as approximately 1000 mJ/cm$^2$, so that polymerization of the monomers M is completed in the matrix polymers. The refractive index of the photopolymerization-type photopolymers of the photopolymer layer 5 may be changed by the incident laser beam LA. Thus, interference fringes generated due to the interference between object laser beam L2 and reference laser beam L3 may be exposed and recorded on the hologram recording medium 3.

Since the holographic stereogram producing apparatus 10 may use the above-described film coating type recording medium 3 having the photopolymer layer 5 of photopolymerization-type photopolymers, a special developing process may not be needed for the hologram recording medium 3 after the exposing process has been performed. As a result, the structure of the holographic stereogram producing apparatus 10 can be relatively simple because a developing unit and so forth can be omitted and a holographic stereogram can be quickly produced.

Holographic-stereogram producing apparatus 10 incorporates an image-data processing portion 11 for processing image data which is to be recorded; a control unit 12 having a control computer 13 for controlling the overall operation of the apparatus; and a holographic-stereogram producing portion 14, including an optical system 15 for producing holographic stereogram.

Image-data processing portion 11 includes an image-processing computer 16 and an associated storage unit 17. Image-data processing portion 11 produces a parallax image data train D3 in accordance with element hologram image data, such as a multiplicity of photographed image data items D1 including parallax information supplied from a parallax-image-train photographing unit 1 incorporating a multiple-lens camera or a movable camera and a plurality of computer image data items D2 including parallax information produced by the image-data producing computer 2. Photographed image data items D1 are generated by simultaneous photographing of an object from more than one position using the multiple-lens camera or taking successive photographs with the movable camera. The photographed image data items D1 include parallax information. The computer image data items D2 consist of a plurality of image data items including parallax information produced by, for example, a CAD (Computer Aided Design) apparatus or CG (Computer Graphics) apparatus.

Image-processing computer 16 of image-data processing portion 11 subjects parallax image data train D3 to a predetermined image process to prepare the data to produce a holographic stereogram resulting in hologram image data D4. Hologram image data D4 is temporarily stored in a storage unit 17, such as a memory of a computer or a hard disc apparatus. When an element of a hologram image is to be recorded on hologram recording medium 3, image-data processing portion 11 sequentially reads element-hologram image data items D5 for one image so as to transmit element-hologram image data items D5 to control computer 13 of control unit 12. Control computer 13 controls holographic-stereogram producing portion 14 to sequentially expose and record the image on hologram recording medium 3, based on element-hologram image data items D5 supplied from image-data processing portion 11.

In holographic-stereogram producing portion 14, each member of optical system 15 is supported on a common support substrate 18. Support substrate 18 is in turn supported by a case 20, dampers 19 being positioned therebetween. Optical system 15 includes an incident-laser-beam optical system 15A, an object-laser-beam optical system 15B and a reference-laser-beam optical system 15C (FIGS. 2(A) and 2(B)). The optical paths of object-laser-beam optical system 15B and reference-laser-beam optical system 15C are of the same length so that light from each reaches exposing and recording portion P1 at the same time in order to enhance coherency of object laser beam L2 and reference laser beam L3. Case 20 shields external light from at least optical system 15 and recording medium 3.

Incident-laser-beam optical system 15A includes a laser beam source 21 for emitting a laser beam L1; a shutter mechanism 22 for passing or restricting laser beam L1; and a half reflective mirror 23 for splitting laser beam L1 into object laser beam L2 and reference laser beam L3. The laser beam source 21 comprises a standard laser-beam apparatus, such as a semiconductor excited YAG laser beam apparatus, an air-cooled argon-ion laser beam apparatus or an air-cooled krypton laser beam apparatus, which emits laser beam L1 of a single wavelength and exhibiting satisfactory coherency.

Shutter mechanism 22 is opened/shut in accordance with control output S1 from control computer 13 in synchronization with the output timing of element-hologram image data items D5. Half mirror 23 splits incident laser beam L1 into a transmissive laser beam and a reflection laser beam. The transmissive laser beam of the beam L1 is used as object laser beam L2, while the reflection laser beam is used as reference laser beam L3. Object laser beam L2 and reference laser beam L3 are incident on corresponding object-laser-beam optical system 15B and reference-laser-beam optical system 15C disposed downstream of half mirror 23. The incident-laser-beam optical system 15A may be further provided with a total reflection mirror or the like (not shown) for the purpose of changing a direction of transmission of laser beam L1 as necessary to insure that the lengths of the optical paths for object laser beam L2 and reference laser beam L3 are the same. Shutter mechanism 22 may be a mechanically operated shutter member or an electronic shutter having an acoustic-optic modulator.

Object-laser-beam optical system 15B includes the following optical elements sequentially disposed along the optical axis in the direction of light transmission: a total reflecting mirror 24, a first cylindrical lens 25, a collimator lens 26, a projection lens 27 and a second cylindrical lens 28. First cylindrical lens 25 is formed by combining a convex lens and a pin hole. Thus, object laser beam L2 that has penetrated half mirror 23 and which has been reflected by total reflecting mirror 24 is diffused into one dimension, corresponding to the width of the display surface of a transmission-type liquid crystal display unit 29 (described below).

After being diffused by first cylindrical lens 25, collimator lens 26 forms object laser beam L2 into a plurality of parallel laser beams and guides the plurality of parallel laser beams to transmission-type liquid crystal display unit 29. Projection lens 27 projects object laser beam L2 to second cylindrical lens 28. Second cylindrical lens 28 converges object laser beam L2 to be forwarded to recording portion P1.

In object-laser-beam optical system 15B, transmission-type liquid crystal display unit 29 is disposed between collimator lens 26 and projection lens 27. Element hologram images are sequentially displayed on transmission-type liquid crystal display unit 29 in accordance with the element-hologram image data items D5 output from control computer 13. In synchronization with an output timing of the element-hologram image data items D5, control computer 13 transmits movement output S2 to a recording-medium feeding mechanism 40 (described below) to control the feeding of the hologram recording medium 3, as desired.

In optical system 15B, object laser beam L2 is diffused by first cylindrical lens 25. Object laser beam L2 is incident on collimator lens 26 so as to be formed into a plurality of parallel laser beams. Object laser beam L2, incident on transmission-type liquid crystal display unit 29 after passing through collimator lens 26 is image-modulated in accordance with element hologram images displayed on liquid crystal display unit 29. Object laser beam L2 is then incident on second cylindrical lens 28 after passing through projection lens 27. Object laser beam L2 is then incident on hologram recording medium 3 in exposing and recording portion P1 so as to record object laser beam L2 on recording medium 3.

Reference-laser-beam optical system 15C includes a cylindrical lens 30, a collimator lens 31 and a total reflecting mirror 32 sequentially positioned along the optical path of reference laser beam L3. Cylindrical lens 30 is formed by combining a convex lens and a pin hole. Cylindrical lens 30 diffuses reference laser beam L3 reflected and split by the half mirror 23 in a one-dimensional direction to correspond to a predetermined width of the display surface of transmission-type liquid crystal display unit 29. Collimator lens 31 forms reference laser beam L3 diffused by cylindrical lens 30 into a plurality of parallel laser beams. Total reflecting mirror 32 reflects reference laser beam L3 to guide the reference laser beam L3 to a position incident on the rear of hologram recording medium 3.

Although shutter mechanism 22 (described above) is located to operate within incident-laser-beam optical system 15A, other structure may be employed. For example, shutter mechanisms may be disposed adjacent hologram recording medium 3 located to operate within object-laser-beam optical system 15B and reference-laser-beam optical system 15C, respectively.

Optical system 15 structured as described above is formed such that the lengths of the optical paths in object-laser-beam optical system 15B and reference-laser-beam optical system 15C for object laser beam L2 and reference laser beam L3 split by the half mirror 23 are substantially the same. Therefore, coherency of the object laser beam L2 and reference laser beam L3 in optical system 15 can be improved, thus improving the resolution of the recorded hologram.

Optical system 15 is provided with an interference-fringe detection portion 33 for interrupting exposing and recording of hologram recording medium 3 (FIG. 2(A)) when satisfactory holographic stereogram cannot be produced as a result of vibrations or the like. Interference-fringe detection portion 33 detects the quality of interference fringes formed by object laser beam L2 and reference laser beam L3. Interference-fringe detection portion 33 may comprise, for example, a CCD (Charge Coupled Device) camera. Interference-fringe detection portion 33 detects fluctuations of the interference fringes formed in a detection region which is different from the region in which hologram recording medium 3 is positioned.

When interference-fringe detection portion 33 detects fluctuation in the interference fringes exceeding a predetermined level, interference-fringe detection portion 33 transmits a detection output to control computer 13. Control computer 13 then closes shutter mechanism 22, interrupting production of the holographic stereogram. When fluctuations in the detected interference fringes drop below a predetermined level, the detection output to control computer 13 is stopped, and normal operation of shutter mechanism 22 resumes to produce the holographic stereogram. Therefore, bright holographic stereogram exhibiting excellent diffraction efficiency can be produced.

Although interference-fringe detection portion 33 is depicted positioned disposed adjacent to hologram recording medium 3, it can be positioned elsewhere. For example, a mirror (complete or half reflective) or the like may be provided so as to guide portions of object laser beam L2 and the reference laser beam L3 to the interference-fringe detection portion 33 positioned at a different location. Another structure may be employed in which a portion of laser beam L1 is directly employed to form interference fringes for detecting vibrations. Interference-fringe detection portion 33 may be further provided individually from optical system 15 so that interference fringes produced by the optical system are used to detect vibrations.

Holographic-stereogram producing apparatus 10 is provided with the recording-medium feeding mechanism 40 (FIG. 3). Recording-medium feeding mechanism 40 intermittently feeds hologram recording medium 3 as it is unreeled from within cartridge 44 in a direction indicated by an arrow "a" shown in FIGS. 2(B) and 3. Hologram recording medium 3 is fed for a distance corresponding to one element hologram at each intermittent movement step in accordance with the movement output S2 command signal transmitted from control computer 13. Shutter mechanism 22 of holographic-stereogram producing apparatus 10 may be operated in accordance with the control output S1 so that the optical path for the laser beam L1 is opened.

As shown in FIG. 1, the elements of the optical system 15 of holographic-stereogram producing apparatus 10 are mounted on a support substrate (an optical surface plate) 18 comprising an aluminum or aluminum alloy plate. If vibrations or the like are felt by holographic-stereogram producing apparatus 10 from outside the apparatus, object laser beam L2 and reference laser beam L3 would not be stably incident on hologram recording medium 3. Therefore, satisfactory interference fringes would not be produced for recording on hologram recording medium 3. Holographic-stereogram producing apparatus 10 therefore incorporates a plurality of dampers 19 for supporting the support substrate 18 to prevent the influence of such vibrations. Each of dampers 19 comprises an elastic member, for example, an air spring, rubber or a coil spring (not shown). One end of each damper 19 is joined to hold support substrate 18, while the other end is secured to a base member 20A of case 20 of the apparatus. Dampers 19 restrain external vibrations exerted on the optical system 15 that are smaller than the wavelength (about 1 μm) of the laser beam L1, preferable ⅕ of the wavelength or smaller. As a result, object laser beam L2 and reference laser beam L3 are provided incident on hologram recording medium free from fluctuations. Thus, holographic-stereogram producing apparatus 10 is able to produce bright holographic stereogram exhibiting an excellent diffraction efficiency.

Accordingly, the holographic-stereogram producing apparatus 10 is arranged to maintain a stable condition wherein even relatively small vibrations on the order of the wavelength of the laser beam L1 may not be exerted on the hologram recording medium 3.

As shown in FIG. 3, the recording-medium feeding mechanism 40 moves the hologram recording medium 3 as it is unreeled from within the cartridge 34 along the recording medium moving system. The hologram recording medium 3 is initially wound around a supply roll 34a rotatively disposed in film cartridge 34, which shields it from light. The hologram recording medium 3 may be led out from or discharged through a discharging portion 34b when moved by drive roller 40 through the recording-medium moving system. The recording-medium moving system may include supply roll 34a, recording-medium feeding mechanism 40, heat roller 42, a pair of discharge rollers 43a and 43b, a cutter 44 and so forth which may be arranged so as to form an S-like shaped path for recording medium 3. The recording-medium moving system may further include an ultraviolet-ray lamp 45 between the recording-medium feeding mechanism 40 and the heat roller 42.

After exposing and recording a hologram, the hologram recording medium 3 may be quickly moved a predetermined distance and stopped. Such movement may produce vibrations on the hologram recording medium 3. As hereinbelow described, the holographic-stereogram producing apparatus 10 includes a braking mechanism which may quickly stop or attenuated such vibrations.

Figure 4:
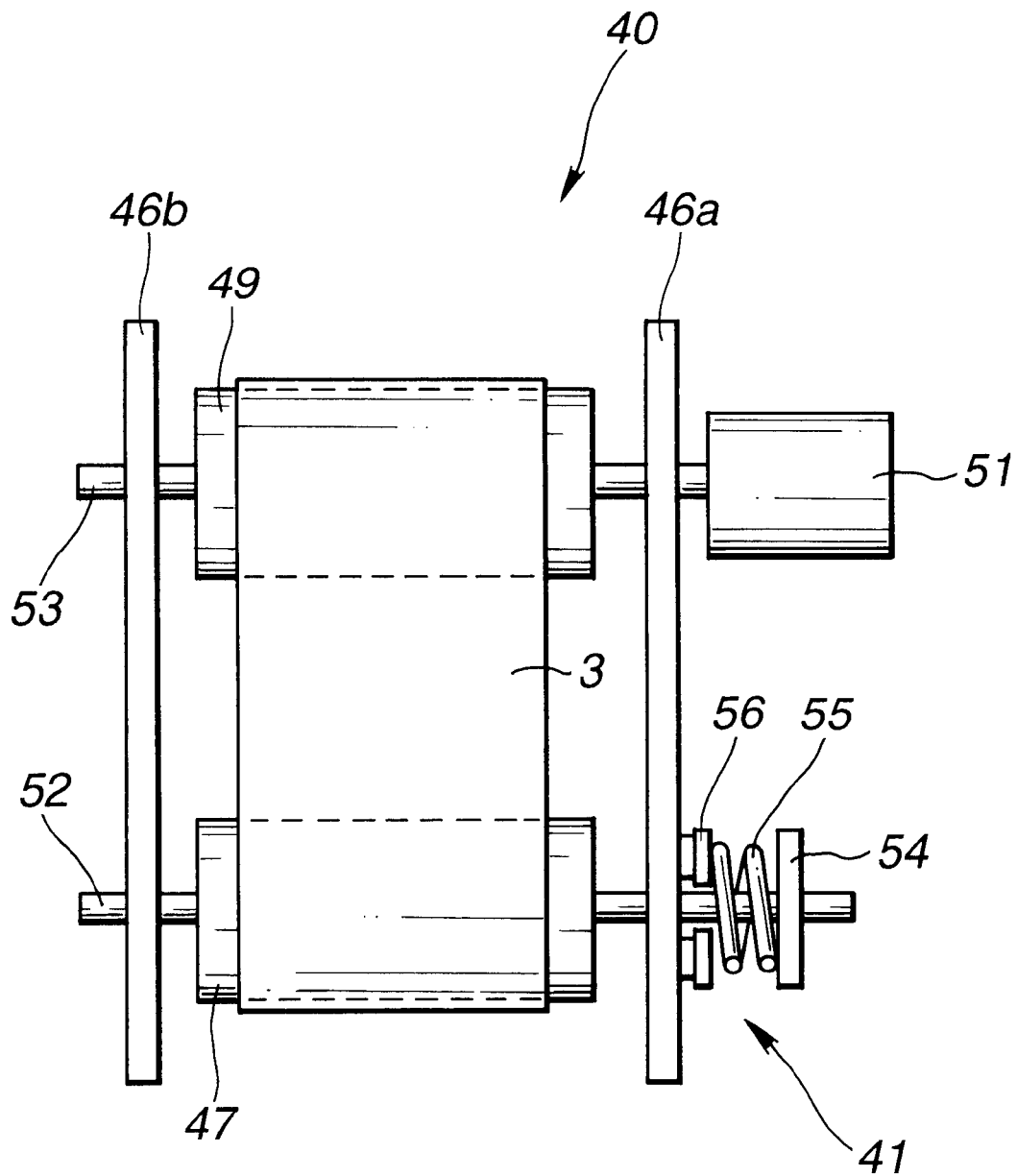
FIG. 4 is a front view of a recording-medium feeding mechanism for the holographic-stereogram producing apparatus of FIG. 1, in which a braking mechanism is provided.

As shown in FIGS. 3 and 4, the recording-medium feeding mechanism 40 may include guide roller 47 joined to a pair of opposite frames 46a and 46b, pinch roller 48, a drive roller 49, a pinch roller 50, braking mechanism 41 and stepping motor 51. The exposing and recording portion P1 may be arranged between the guide roller 47 and the drive roller 49.

The guide roller 47 may be secured to support shaft 52 which, in turn, may be rotatably supported by frames 46a and 46b and may be located at a position between the incident portion for the object laser beam L2 and the film cartridge 34. The braking mechanism 41 may be provided at an end of support shaft 52 so as to project outwardly from the frame 46a, as shown in FIG. 4. The hologram recording medium 3 may be wound over the outer surface of the guide roller 47 and held between the guide roller 47 and the pinch roller 48.

The drive roller 49 may be secured to drive shaft 53 which may be rotatably supported by the frames 46a and 46b. Stepping motor 51 may be coupled to an end of the drive shaft 53 which projects outwardly from the frame 46a. The drive shaft 53 may be intermittently rotated by stepping motor 51. The hologram recording medium 3 may be held between the outer surfaces of the drive roller 49 and the pinch roller 50 and may be intermittently moved due to the intermittent rotations of the drive shaft 53 by the stepping motor 51.

The guide roller 47 and the drive roller 49 may have the same diameter. Moreover, the support shaft 52 and the drive shaft 53 may be parallel to each other.

The recording-medium feeding mechanism 40 moves the hologram recording medium 3 at a position between the guide roller 47 and the drive roller 49 such that the right and reverse sides of the hologram recording medium 3 are perpendicular to the optical axes of the object-laser-beam optical system 15B and the reference laser beam 15C.

The braking mechanism 41 may include a tension adjustment plate 54, a compression coil spring 55 and a slip plate 56 coupled to the support shaft 52 in such order from the outside as shown in FIG. 4. The tension adjustment plate 54 is secured to the support shaft 52. The slip plate 56 is pressed against the frame 46a by the elastic force of the compression coil spring 55 which is compressed between the tension adjustment plate 54 and the slip plate 56. The elastic force of the compression coil spring 55 may be adjusted by adjusting the position at which the tension adjustment plate 54 is secured to the support shaft 52.

The elastic force of the compression coil spring 55 which presses the slip plate 56 against the frame 46a is the load exerted on the rotation of the support shaft 52. When the hologram recording medium 3 is intermittently moved due to the intermittent rotation of the stepping motor 51, the braking mechanism 41 may exert a braking force on the hologram recording medium 3. However, the elastic force of the compression coil spring 55 of the braking mechanism 41 may be smaller than the rotational force of the stepping motor 51 so that movement of the hologram recording medium 3 is not inhibited. Accordingly, the braking mechanism 41 may not operate to stop the movement of the hologram recording medium 3, but instead may operate to resist the movement of the hologram recording medium such that the hologram recording medium is substantially taut when it is being moved due to the rotation of the stepping motor 51.

Since the braking mechanism 41 exerts a load against the movement of the hologram recording medium 3 as described above, the creation of vibrations which may otherwise occur except in a period in which the hologram recording medium 3 is moved in the exposing and recording portion P1 can be prevented. Further the braking mechanism 41 in cooperation with the S-shape recording-medium moving system, may prevent overrun of the hologram recording medium 3 after it has been moved. Moreover, vibrations of the hologram recording medium 3 created due to a movement operation can be quickly be damped or attenuated.

The recording-medium feeding mechanism 40 may further include holding mechanism 57 for stably maintaining the hologram recording medium 3 in the exposing and recording portion P1. As shown in FIG. 3, the holding mechanism 57 may include a louver film 58, a one-dimensional diffusion plate 59, and a light-guiding block member 60. The object laser beam L2 may be made incident on a portion of the hologram recording medium 3 in the holding mechanism 57. The holding mechanism 57 may hold the hologram recording medium 3 within the width of each element hologram which is being exposed and recorded.

The louver film 58 is an optical element having fine louver lattices and may be in contact with either surface of the hologram recording medium 3. The louver film 58 may prevent the reference laser beam L3 which has penetrated the hologram recording medium 3 to again be incident on the hologram recording medium 3 after being reflected by the diffusion plate 59. Thus, the louver film 58 may prevent exposing and recording of incorrect interference fringes. The diffusion plate 59 is an optical element for diffusing the incident object laser beam L2 in a vertical direction as viewed in FIG. 3, that is, in the direction of the major axis of each element hologram which is being exposed and recorded on the hologram recording medium 3. The diffusion plate 59 may be intermittently joined to the louver film 58 and may impart a vertical angle of visibility to the holographic stereogram which is produced.

The transmissive substrate 60 may be a solid member made of a transparent material such as glass or transparent plastic having an appropriate thickness. The louver film 58 and the diffusion plate 59 which may be joined to each other are bonded to the light-guiding block member 60. The object laser beam L2 may be made incident on an opposite surface of the light-guiding block member 60. The light-guiding block member 60 may be coupled to a support member (not shown) to urge the hologram recording medium 3 towards the guide roller 47 and the drive roller 49.

As shown in FIG. 3, heat roller 42 may be positioned downstream from the recording portion and drive roller 49. The hologram recording medium 3 is wound around the outer surface of the heat roller 42 at a winding angle of approximately 180°. The heat roller 42 may include a heater (not shown) to maintain the temperature of the heat roller 42 at about 120° C. Thus, the heat roller 42 heats the hologram recording medium 3 to raise the degree of modulation of the refractive index of the photopolymer layer 5 thereof.

Discharge rollers 43a and 43b may be intermittently rotated in synchronization with drive roller 49 by a stepping motor which is rotated by movement output S2 transmitted from control computer 13 of the control unit 12. The discharge rollers 43a and 43b may intermittently move the hologram recording medium 3 a distance corresponding to one element of a hologram after recording of an element image has been completed. Therefore, the hologram recording medium 3 can be properly moved through the exposing and recording portion P1 without deflecting from contact with the outer surface of the heat roller 42 by the discharge rollers 43a and 43b and the recording-medium feeding mechanism 40.

The cutter 44 is operated in accordance with the movement output S2 transmitted from the control computer 12. The cutter 44 cuts the hologram recording medium 3 so as to have a predetermined length or after a predetermined length has passed therethrough. That is, the cutter 44 cuts the hologram recording medium 3 so that the cutted portion has all of the holographic stereogram images based on image data of the parallax image train have been exposed and recorded on the hologram recording medium 3. Therefore, the holographic-stereogram producing apparatus 10 discharges a portion of the hologram recording medium 3 in which the hologram image has been exposed and recorded as one holographic stereogram image.

The ultraviolet-ray lamp 45 may be disposed along the path of the recording medium 3 between the drive roller 49 and the heat roller 42. The ultraviolet-ray lamp 45 emits ultraviolet rays LB having power of approximately 1000 mJ/cm$^2$ to the hologram recording medium 3 on which the holographic stereogram based on the interference fringes of the object laser beam L2 and the reference laser beam L3 has been exposed and recorded. As a result, polarization of monomers M in the matrix polymer may be completed.

The output S2 corresponding to one element hologram is transmitted from the control computer 13 of the control unit 12 whenever one element image is exposed and recorded. As a result, the stepping motor 51 is rotated whereupon the drive roller 49 is rotated a corresponding angular amount and the hologram recording medium 3 is moved a distance corresponding to the one element hologram so that a non-exposed portion of the hologram recording medium 3 is moved to a position corresponding to the exposing and recording portion P1.

Shutter mechanism 22 is opened once the non-exposed portion of the recording medium is properly positioned. At this time, object laser beam L2 which has been image-modulated, and reference laser beam L3 are incident on hologram recording medium 3 positioned at exposing and recording portion P1, and interference fringes corresponding to the element hologram image are exposed and recorded. After exposing and recording of this one element is completed, hologram recording medium 3 is moved once again. These operations are sequentially performed so that a holographic stereogram is produced.

The stepping motor 51 may be intermittently rotated at uniform speed to move the hologram recording medium 3. The exposing and recording operation may be performed after movement of the hologram recording medium 3 has stopped and vibrations have been attenuated. However, the present invention is not so limited. As an example, and with reference to FIG. 9, the holographic-stereogram producing apparatus 10 may be arranged such that the hologram recording medium 3 may be gradually accelerated during an initial movement stage, then gradually decelerated, and stopped. The holographic-stereogram producing apparatus 10 having the above-mentioned structure and braking mechanism 41 may prevent the hologram recording medium 3 from overrunning. Moreover, vibrations of the recording-medium moving system may be prevented. Therefore, in the holographic-stereogram producing apparatus 10, the time to attenuate vibrations can be shortened and a holographic stereogram can be efficiently produced.

It is preferable to have the time from an operation start to the exposing and recording remain constant. However, this may be difficult to obtain due to a weakening in the tension of the hologram recording medium 3 due to the expansion thereof over time, slippage and play of each roller and the power transmission system, a change in the characteristics such as backlash of each element of the recording-medium feeding mechanism 40 and so forth. As a result, the hologram recording medium 3 is intermittently moved for a predetermined distance before performing the exposing and recording operation and then placed in an idle or stably mode for a predetermined time for enabling vibrations to be attenuated. Thereafter, the exposing and recording operation is performed.

In the holographic-stereogram producing apparatus 10, the creation of small vibrations on the order of the wavelength of the laser beam L1 may be prevented during exposing and recording of the interference fringes of the object laser beam L2 and the reference laser beam L3 on the hologram recording medium 3. Moreover, the moving hologram recording medium 3 can be quickly and stably stopped. As a result, holographic-stereogram producing apparatus 10 may efficiently produce a holographic stereogram having excellent diffraction efficiency.

Figure 5:
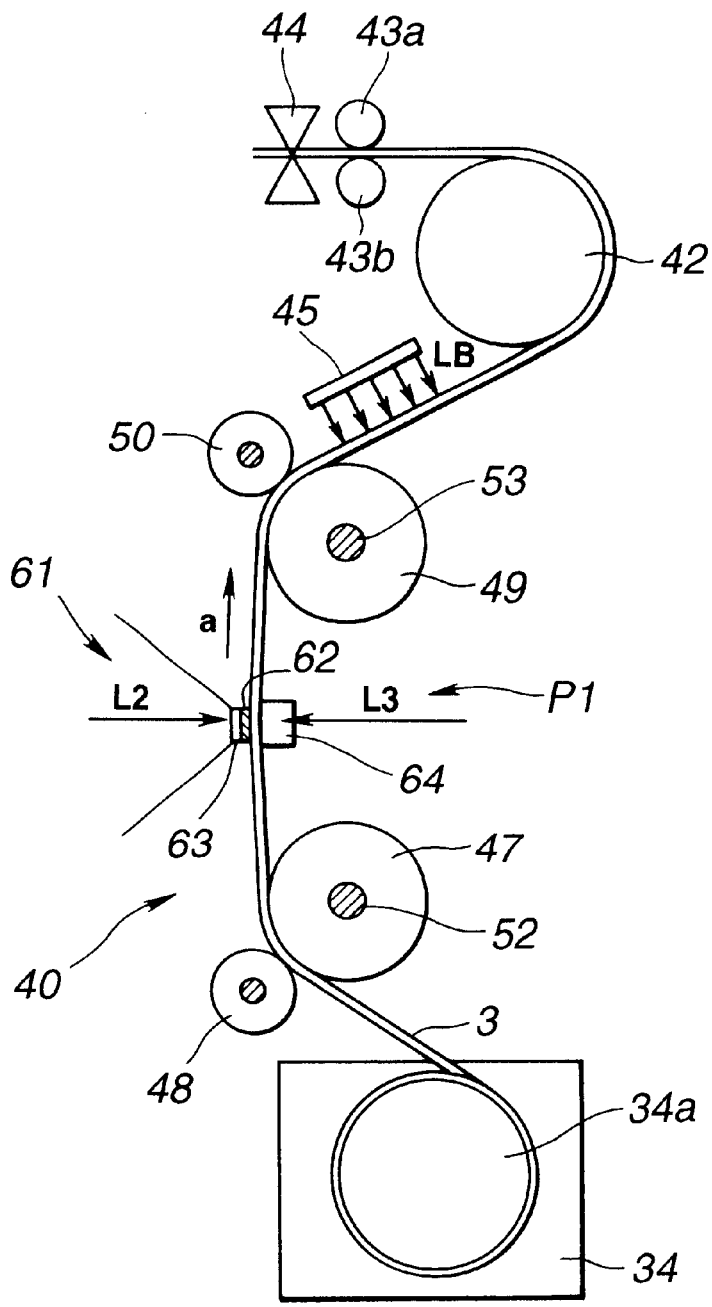
FIG. 5 is a plan view of a recording-medium moving system provided for the holographic-stereogram producing apparatus, in which a light-guiding block member is provided for the reference laser beam portion and the light-guiding block member is pressed against the hologram recording medium from the reference laser beam portion.

Although the holographic-stereogram producing apparatus 10 according to the first embodiment includes holding mechanism 57 which is disposed whereat the object laser beam L2 is incident on the hologram recording medium 3, the present apparatus is not so limited and a number of other arrangements may also be utilized. For example, and with reference to FIG. 5, holding mechanism 61 may be utilized which incorporates an optical element formed by bonding louver film 62 and one-dimensional diffusion plate 63 to each other and arranged in a noncontact manner in a region wherein the object laser beam L2 is incident. In another arrangement, a light-guiding block member 64 which enables the reference laser beam L3 to penetrate therethrough may be arranged in a region whereat the reference laser beam L3 is incident.

Further, although the braking mechanism 41 includes compression coil spring 55 and slip plate 56 each having a relatively simple structure, the present invention is not so limited and a number of other arrangements may be utilized. For example, a static braking mechanism which may be formed of rubber may be employed.

Figure 6:
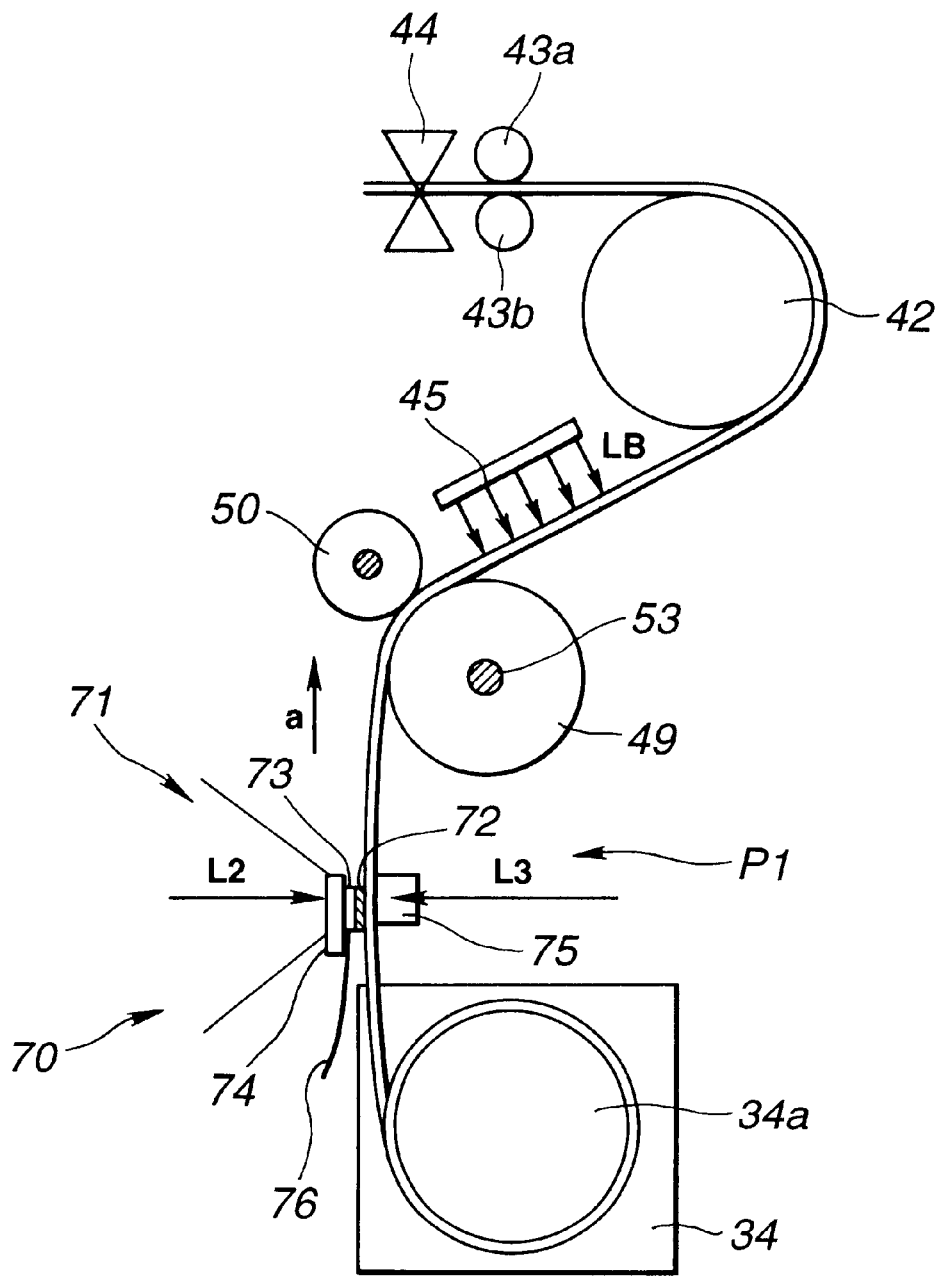
FIG. 6 is a plan view of a recording-medium moving system provided for a holographic-stereogram producing apparatus in accordance with another embodiment of the present invention, in which a light-guiding block member having an elastic means is provided for an object laser beam portion and a hologram recording medium is urged from the object laser beam portion.
Figure 7:
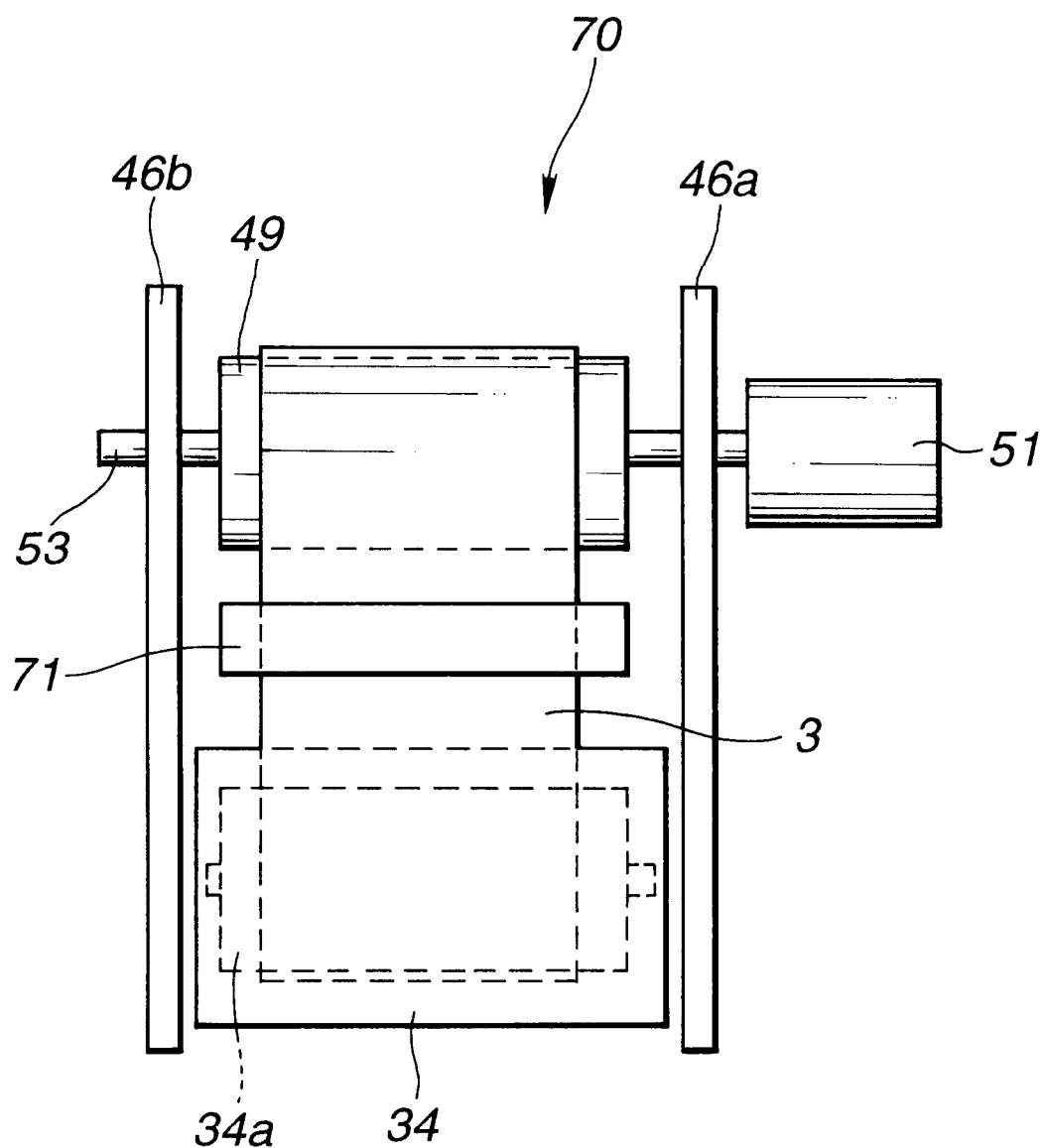
FIG. 7 is a front view of a recording-medium feeding mechanism provided for the holographic-stereogram producing apparatus of FIG. 6.

A holographic-stereogram producing apparatus according to a second embodiment includes a recording-medium feeding mechanism 70 shown in FIGS. 6 and 7. Elements of such apparatus and/or mechanism which are similar to those of the holographic-stereogram producing apparatus 10 of the first embodiment have the same reference numerals and a description thereof is omitted herein.

The recording-medium feeding mechanism 70 may include a pressure maintaining mechanism 71 which holds the hologram recording medium 3 in the exposing and recording portion P1 during exposing and recording of each element hologram generated based on the interference fringes of the object laser beam L2 and the reference laser beam L3 on the hologram recording medium 3. Moreover, unlike in the first embodiment, the recording-medium feeding mechanism 70 does not utilize guide roller 47, pinch roller 48, and braking mechanism 41 as indicated in FIGS. 6 and 7. As shown in FIG. 6, the pressure maintaining mechanism 71 may include a louver film 72, a one-dimensional diffusion plate 73, a light-guiding block member 74 provided with an elastic device or leaf spring 76 and a light-guiding block member 75. The pressure maintaining mechanism 71 may be arranged upstream or in front of the drive roller 49 and the pinch roller 50 of the recording-medium feeding mechanism 70 at a region whereat the object laser beam L2 and the reference laser beam L3 are incident on the hologram recording medium 3. The louver film 72 and the diffusion plate 73 may operate or function in a manner similar to film 58 and plate 59 of the first embodiment. The light-guiding block member 75 may be formed of glass, transparent plastic or the like having an appropriate thickness and arranged in a region whereat the reference laser beam L3 is incident on the hologram recording medium 3. The pressure maintaining mechanism 71 may be arranged so as to be in contact with a surface of the hologram recording medium 3 at a position corresponding to where the reference laser beam L3 is incident. An optical element may be formed by bonding a first element formed by bonding a surface of the light-guiding block member 74 provided with the leaf spring 76 to a surface of a second element formed by bonding and integrating the louver film 72 and the 1D diffusion plate 73 with each other. Such optical element is arranged in a position whereat the object laser beam L2 is incident on the hologram recording medium 3. The leaf spring 76 of this optical element may press the hologram recording medium 3 against the light-guiding block member 75. As a result, the pressure maintaining mechanism 71 may press and hold the hologram recording medium 3 so as to restrain or prevent the creation of small vibrations in the hologram recording medium 3.

Upon rotation of stepping motor 51, the hologram recording medium 3 may be moved in a direction indicated by an arrow a. At this time, the light-guiding block member 74 with the leaf spring 76 may urge or apply a predetermined force to the hologram recording medium 3 at the exposing and recording portion P1. As a result, the hologram recording medium 3 can be maintained in a state in which the light-guiding block member 75 is pressed against the hologram recording medium 3 even during intermittent movement thereof. Therefore, undesirable vibrations or movement of the hologram recording medium 3 before the exposing and recording operation can be prevented. Additionally, upon stopping the hologram recording medium 3, unnecessary movement, such as an overrun, can be inhibited. Thus, the present holographic-stereogram producing apparatus may perform an exposing and recording operation wherein the hologram recording medium 3 is in contact with the light-guiding block member 75.

Figure 9:
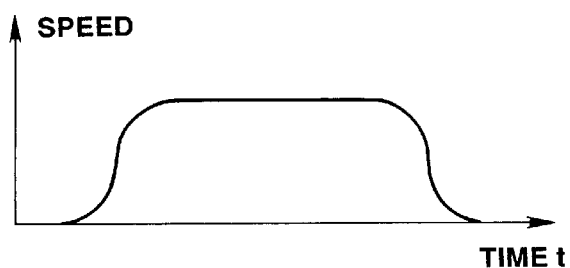
FIG. 9 is a graph of movement speed of the hologram recording medium as a function of time.
Figure 10:
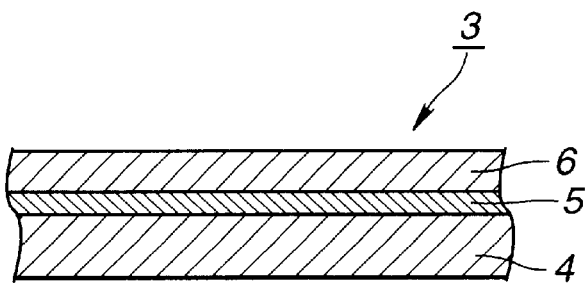
FIG. 10 is a cross sectional view of a portion of the hologram recording medium.

In the above-described holographic-stereogram producing apparatus and in a manner similar to that of the apparatus 10 of the first embodiment, stepping motor 51 may be arranged to gradually increase the movement speed of the hologram recording medium 3 during an initial operational stage and then to gradually reduce the speed of the hologram recording medium 3 to a stop condition, as shown in FIG. 9. Further, in such holographic-stereogram producing apparatus, the pressure maintaining mechanism 71 presses and holds the hologram recording medium 3 so as to prevent an overrun of the hologram recording medium 3 and to prevent vibrations. Therefore, such holographic-stereogram producing apparatus may reduce the time needed for attenuation of vibrations before the exposing and recording operation. As a result, a holographic stereogram can be efficiently produced.

Figure 8:
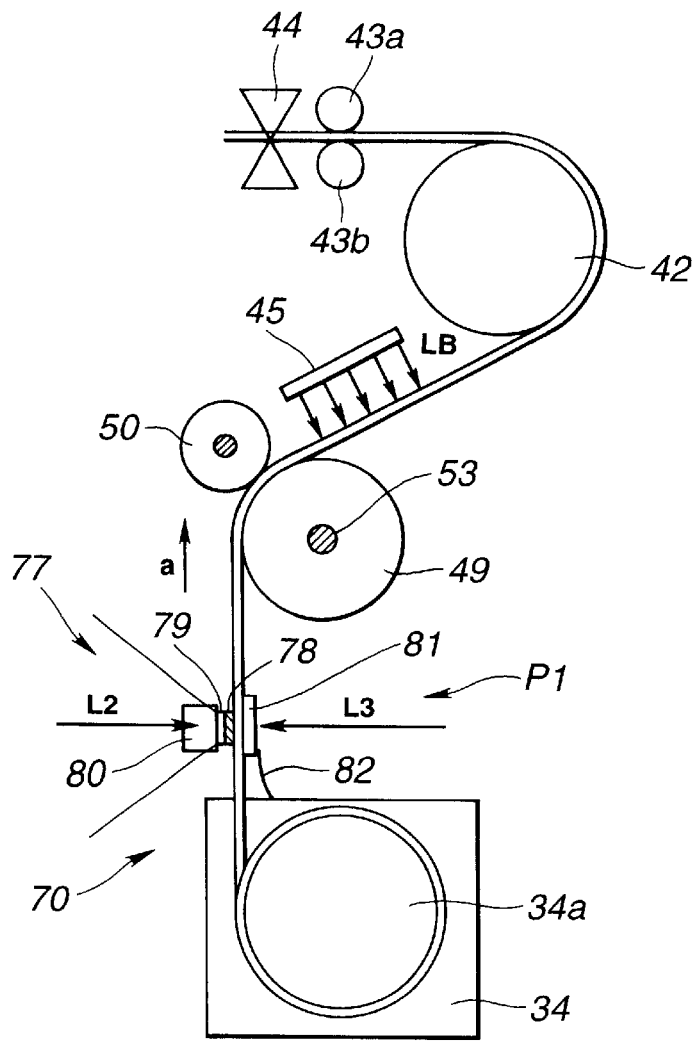
FIG. 8 is a plan view of a recording-medium moving system provided for a holographic-stereogram producing apparatus in accordance with a modification of the present invention, in which the light-guiding block member having an elastic member is provided for a reference laser beam portion and a hologram recording medium is urged from the reference laser beam portion.

Although the pressure maintaining mechanism 71 may include an optical element which is configured as described above, the present invention is not so limited and other arrangements such as shown in FIG. 8 may be employed. As shown therein, a pressure-maintaining mechanism 77 may be utilized which may include an optical element formed by bonding a light-guiding block member 80 to an element formed of a louver film 78 and a one-dimensional diffusion plate 79 and arranged in a region wherein the object laser beam L2 is incident on the hologram recording medium 3. Additionally, a light-guiding block member 81 may be arranged in a region wherein the reference laser beam L3 is incident on the hologram recording medium 3 and may permit the reference laser beam L3 to penetrate therethrough. In addition, a leaf spring 82 may be arranged to press the light-guiding block member 81 against a portion of the hologram recording medium in which the object laser beam L2 is incident.

Although the mechanism for pressing the light-guiding block member 74 or 81 against the hologram recording medium 3 has been described as leaf spring 76 or 82 each having a relatively simple structure, the present invention is not so limited and other arrangements may be utilized. For example, a static braking mechanism formed of rubber may be employed.

The light-guiding block member according to the first and second embodiments and arranged to be in contact with the hologram recording medium 3 may be brought into contact therewith through solution, such as index matching solution.

Thus, the present apparatus may expose and record synthesized element hologram images on a hologram recording medium 3.

The present holographic-stereogram producing apparatus may be utilized for exposing and recording holographic stereogram having only parallax information in the lateral direction (so-called Horizontal Parallax Only) and holographic stereogram having parallax information in the lateral direction and the vertical direction (so-called Full Parallax).

In the holographic-stereogram producing apparatus, the object laser beam L2 and the reference laser beam L3 may be converted into a dot shape in place of an oblong shape by the cylindrical lenses. Moreover, the hologram recording medium 3 is basically moved in a two-dimensional manner to the converging position to perform whole image exposure.

The present holographic-stereogram producing apparatus may be utilized for exposing and recording monochrome element hologram images on hologram recording medium 3. However, the present invention is not limited thereto. For example, the present holographic-stereogram producing apparatus may be provided with three primary colors from red, green and blue laser beam sources.

Moreover, optical systems and liquid crystal display units corresponding to the laser beam sources may be provided.

The present hologram-image recording apparatus may incorporate a braking device which performs a braking operation or applies a load when the recording medium is moved by a drive device. As a result, vibrations in the recording medium created during the exposing and recording operation as well as vibrations exerted from outside may be prevented or attenuated.

Further, the present hologram-image recording apparatus may stabilize interference fringes of an object laser beam and a reference laser beam so that element hologram is precisely exposed and recorded on the recording medium. As a result, a holographic stereogram composed of bright and stable element hologram and having excellent quality can be produced.

Furthermore, the present hologram-image recording apparatus may significantly shorten the time from the completion of the movement of the recording medium to the attenuation of the vibrations. As a result, the time needed to complete the recording process can be shortened.

Although preferred embodiments of the present invention and modifications thereof have been described in detail herein, it is to be understood that this invention is not limited to these embodiments and modifications, and that other modifications and variations may be effected by one skilled in the art without departing from the spirit and scope of the invention as defined by the appended claims.

What is claimed is:

1. A hologram-image recording apparatus comprising:
    an exposing recording portion for sequentially exposing and recording interference fringes generated by an object laser beam modulated in accordance with each element image of parallax images and a reference laser beam having coherency with the object laser beam on a recording medium as an elemental hologram, wherein the object laser beam is incident on a surface of the recording medium and the reference laser beam is incident on one of said surface and an opposite surface of the recording medium;
    moving means for moving the recording medium in a predetermined direction; and
    braking means for applying a load to the recording medium which resists the movement thereof so as to maintain the recording medium substantially taut when the recording medium is moved and which is insufficient to stop the movement of the recording medium.

2. A hologram-image recording apparatus according to claim 1, further comprising guiding means for guiding the movement of said recording medium and wherein said braking means is coupled to said guiding means and a predetermined torque load is exerted on said guiding means to resist the movement of said recording medium.

3. A hologram-image recording apparatus according to claim 1, wherein the moving means moves the recording medium for a predetermined distance and the recording medium is put on standby for a predetermined time subsequent to the moving operation prior to a recording operation.

4. A hologram-image recording apparatus according to claim 1, wherein said moving means controls the movement of said recording medium such that a speed of said recording medium is gradually increased during an initial movement thereof and is gradually decreased when said recording medium is to be stopped.

5. A hologram-image recording apparatus according to claim 1, wherein the exposing and recording portion includes an optical element which contacts at least one surface of the recording medium, and one of the object laser beam and the reference laser beam is incident on the recording medium through the optical element.

6. A hologram-image recording apparatus comprising:
    an exposing recording portion for sequentially exposing and recording interference fringes generated by an object laser beam modulated in accordance with each element image of parallax images and a reference laser beam having coherency with the object laser beam on a recording medium as an elemental hologram, wherein the object laser beam is incident on a surface of the recording medium and the reference laser beam is incident on one of said surface and an opposite surface of the recording medium;

moving means for moving the recording medium in a predetermined direction;

braking means for applying a load to the recording medium which resists the movement thereof;

wherein the exposing and recording portion includes an optical element which contacts at least one surface of the recording medium, and one of the object laser beam and the reference laser beam is incident on the recording medium through the optical element; and wherein the optical element is supported by elastic means for applying an elastic force on the recording medium.

7. A hologram-image recording apparatus according to claim 5, wherein the optical element has a pair of elements disposed across the recording medium and arranged to be in contact with two sides of the recording medium so as to hold the recording medium.

8. A hologram-image recording apparatus comprising:

an exposing recording portion for sequentially exposing and recording interference fringes generated by an object laser beam modulated in accordance with each element image of parallax images and a reference laser beam having coherency with the object laser beam on a recording medium as an elemental hologram, wherein the object laser beam is incident on a surface of the recording medium and the reference laser beam is incident on one of said surface and an opposite surface of the recording medium;

moving means for moving the recording medium in a predetermined direction; and braking means for applying a load to the recording medium which resists the movement thereof;

wherein the exposing and recording portion includes an optical element which contacts at least one surface of the recording medium, and one of the object laser beam and the reference laser beam is incident on the recording medium through the optical element;

wherein the optical element has a pair of elements disposed across the recording medium and arranged to be in contact with two sides of the recording medium so as to hold the recording medium; and wherein one of the elements of said pair is formed of glass, and the other element thereof is supported through elastic means for exerting force toward the recording medium so as to hold the recording medium.

9. A hologram-image recording method for recording images on a recording medium, said method comprising the steps of:

moving said recording medium in a predetermined direction by use of a moving means;

applying a load to the recording medium by using a braking means which resists the movement of the recording medium so as to maintain the recording medium substantially taut when the recording medium is moved and which is insufficient to stop the movement of the recording medium;

generating interference fringes by an object laser beam modulated in accordance with each element image of parallax images and a reference laser beam having coherency with the object laser beam; and sequentially exposing and recording interference fringes on the recording medium as an elemental hologram by use of an exposing and recording portion.

10. A hologram-image recording method according to claim 9, further comprising the step of guiding the movement of said recording medium by use of a guiding means and wherein said braking means is coupled to said guiding means and wherein a predetermined torque load is exerted on said guiding means to resist the movement of said recording medium.

11. A hologram-image recording method according to claim 9, wherein the moving means moves the recording medium for a predetermined distance and the recording medium is put on standby for a predetermined time subsequent to the moving operation prior to a recording operation.

12. A hologram-image recording method according to claim 9, wherein the exposing and recording portion includes an optical element which contacts at least one surface of the recording medium, and one of the object laser beam and the reference laser beam is incident on the recording medium through the optical element.

13. A hologram-image recording method according to claim 9, wherein said moving means controls the movement of said recording medium such that a speed of said recording medium is gradually increased during an initial movement thereof and is gradually decreased when said recording medium is to be stopped.

14. A hologram-image recording method for recording images on a recording medium, said method comprising the steps of:

moving said recording medium in a predetermined direction by use of a moving means;

applying a load to the recording medium by using a braking means which resists the movement of the recording medium;

generating interference fringes by an object laser beam modulated in accordance with each element image of parallax images and a reference laser beam having coherency with the object laser beam; and sequentially exposing and recording interference fringes on the recording medium as an elemental hologram by use of an exposing and recording portion;

wherein said moving means controls the movement of said recording medium such that a speed of said recording medium is gradually increased during an initial movement thereof and is gradually decreased when said recording medium is to be stopped; and wherein the optical element is supported by elastic means for applying an elastic force on the recording medium.

15. A hologram-image recording method according to claim 13, wherein the optical element has a pair of elements disposed across the recording medium and arranged to be in contact with two sides of the recording medium so as to hold the recording medium.

16. A hologram-image recording method for recording images on a recording medium, said method comprising the steps of:

moving said recording medium in a predetermined direction by use of a moving means;

applying a load to the recording medium by using a braking means which resists the movement of the recording medium;

generating interference fringes by an object laser beam modulated in accordance with each element image of parallax images and a reference laser beam having coherency with the object laser beam; and sequentially exposing and recording interference fringes on the recording medium as an elemental hologram by use of an exposing and recording portion;

wherein said moving means controls the movement of said recording medium such that a speed of said recording medium is gradually increased during an initial movement thereof and is gradually decreased when said recording medium is to be stopped;

wherein the optical element has a pair of elements disposed across the recording medium and arranged to be in contact with two sides of the recording medium so as to hold the recording medium; and wherein one of the elements of said pair is formed of glass, and the other element thereof is supported through elastic means for exerting force toward the recording medium so as to hold the recording medium.

17. A hologram image recording method according to claim 9, wherein the moving means is provided downstream of the exposing and recording portion and the braking means is provided upstream of the exposing and recording portion.

18. A hologram-image recording apparatus according to claim 1, wherein the moving means is provided downstream of the exposing and recording portion and the braking means is provided upstream of the exposing and recording portion.

19. A hologram-image recording apparatus comprising:

moving means for moving a recording medium;

an exposing recording portion for recording interference fringes generated by an object laser beam and a reference laser beam on said recording medium; and means for applying a load to the recording medium which resists the movement thereof so as to maintain the recording medium substantially taut when the recording medium is moved and which is insufficient to stop the movement of the recording medium.

20. A hologram-image recording apparatus according to claim 19, wherein the load applied by the applying means causes said recording medium to be in a taut condition when adjacent to said exposing recording portion and does not prevent the movement of said recording medium.

21. A hologram-image recording method comprising the steps of:

moving a recording medium;

recording interference fringes generated by an object laser beam and a reference laser beam on said recording medium; and applying a load to the recording medium which resists the movement thereof so as to maintain the recording medium substantially taut when the recording medium is moved and which is insufficient to stop the movement of the recording medium.

22. A hologram-image recording method according to claim 21, wherein the applied load causes the portion of said recording medium being recorded on and adjacent portions to be in a taut condition and does not prevent the movement of said recording medium.

* * * * *